United States Patent [19]
Lee et al.

[11] Patent Number: 5,771,788
[45] Date of Patent: Jun. 30, 1998

[54] FOOD STORAGE DEVICE EMPLOYING A THERMOELECTRIC ELEMENT AS A HEAT SOURCE AND SINK

[75] Inventors: Young-Gil Lee, Asan; Suk-Jae Choi, Cheonan, both of Rep. of Korea

[73] Assignee: Mando Machinery Corp., Rep. of Korea

[21] Appl. No.: 896,044

[22] Filed: Jul. 17, 1997

[30] Foreign Application Priority Data

Jul. 23, 1996 [KR] Rep. of Korea ...................... 96-29738

[51] Int. Cl.[6] .................................................. C12H 1/00
[52] U.S. Cl. ............................... 99/468; 99/470; 99/483; 99/486; 99/451; 435/286.1; 435/289.1; 435/300.1
[58] Field of Search ............................. 99/276, 331, 451, 99/467, 468, 470, 472, 483, 486, 493, 506, 534, 535, 286.1, 289.1; 435/289–291, 313, 5, 6, 316, 69.1, 172.1, 300.1, 813, 819; 426/49, 52, 615, 231; 73/861.41; 536/27–29; 514/12, 44; 165/64, 263, 918; 62/229, 157, 187, 115

[56] References Cited

U.S. PATENT DOCUMENTS

| | | | |
|---|---|---|---|
| 5,142,969 | 9/1992 | Chun | 99/468 |
| 5,180,745 | 1/1993 | Cayre | 435/69.1 |
| 5,351,745 | 10/1994 | Park | 99/470 X |
| 5,398,599 | 3/1995 | Woo | 99/483 X |
| 5,421,247 | 6/1995 | Shim | 99/468 |
| 5,424,210 | 6/1995 | Bae et al. | 435/286.6 |
| 5,456,164 | 10/1995 | Bang | 99/486 X |
| 5,458,186 | 10/1995 | Lee et al. | 99/486 X |
| 5,470,746 | 11/1995 | Kim | 99/493 X |
| 5,477,915 | 12/1995 | Park | 99/468 X |
| 5,542,262 | 8/1996 | Park | 62/229 |
| 5,555,797 | 9/1996 | Chun | 435/286.1 |
| 5,669,674 | 9/1997 | Lee et al. | 62/115 |

*Primary Examiner*—Timothy F. Simone
*Attorney, Agent, or Firm*—Anderson, Kill & Olick, P.C.

[57] ABSTRACT

A food storage device has a circulation tube arranged around a food compartment, a heat exchanger connected to the circulation tube, and a pump for forcibly circulating fluid. A thermoelectric element includes a first heat transfer plate in thermal contact with the heat exchanger for heating the fluid in a fermenting mode of the food storage device and for cooling the fluid in a refrigerating mode of the food storage device, thermoelectric material and a second heat transfer plate in an external environment.

7 Claims, 4 Drawing Sheets

FOOD STORAGE DEVICE EMPLOYING A THERMOELECTRIC ELEMENT AS A HEAT SOURCE AND SINK

FIELD OF THE INVENTION

The present invention relates to a food storage device; and, more particularly, to an improved food storage device of the type employing a thermoelectric element having an increased cooling/heating efficiency by forcibly circulating a fluid therein.

DESCRIPTION OF THE PRIOR ART

A food storage device is normally used to ferment or age foods, e.g., kimchi, necessitating a fermenting treatment till the foods reach wanted taste and to store the foods in a proper environment in order to preserve a flavor or taste thereof for an extended period of time. For these functions, the food storage device is equipped with a heating/cooling unit. In recent years, various food storage devices employing a thermoelectric element as a heat source/sink have been proposed.

Referring to FIG. 1, there is shown one of the conventional food storage devices employing a thermoelectric element 10 as a heat sink/source. A food storage chamber 5 within which foods are contained is surrounded with a liquid container 6 fixed on an inner wall 7. The inner wall 7 is fixed to an outer wall 8 via a thermal insulation material 9. In this construction, heat transfer from the liquid to the thermoelectric element 10 leads to a descent of the temperature in the food storage chamber 5. As a result, the foods can be kept in a refrigerated storage. Further, heat transfer from the thermoelectric element 10 to the liquid elevates the temperature in the food storage chamber 5 to thereby provide the foods with a fermenting environment.

On the other hand, installed in a machinery compartment are a dissipating plate 12 and a cooling fan 13 which serve to efficiently dissipate the heat transferred from the thermoelectric element 10 when the heat transfer from the liquid to the thermoelectric element 10 occurs.

In the food storage device constructed in this manner, however, since the thermoelectric element 10 is adapted to heat/cool the liquid only partially, heat transfer efficiency between the liquid and the thermoelectric element is low. Consequently, if there are a large amount of foods to be refrigerated, it will require a prolonged period to cool the temperature within the food storage chamber to a desired level. Furthermore, in such a situation, the thermoelectric element is forced to overwork, subjecting to an overload which lead to a reduction of service life of the same.

SUMMARY OF THE INVENTION

It is, therefore, a primary object of the invention to provide a food storage device having an increased heat transfer efficiency between a thermoelectric element and a refrigerating fluid by circulating the refrigerating fluid therein compulsorily.

The above and other objects of the invention are accomplished by providing a food storage device provided with a food compartment within which the food is contained, the food storage device comprising: a circulation tube for providing a fluid with a flow path arranged around the food compartment; a heat exchanger connected to both ends of the circulation tube to thereby form a closed flow path for the fluid together with the circulation tube; at least a pump mounted to one portion of the closed flow path so as to forcibly circulate the fluid along the closed flow path; and a thermoelectric element including a first heat transfer plate in thermal contact with said heat exchanger for heating the fluid in a fermenting mode of the food storage device and for cooling the fluid in a refrigerating mode of the food storage device, thermoelectric material and a second heat transfer plate opposed to the first heat transfer plate about the thermoelectric material to be in an external environment, the first and the second heat transfer plates adhering to the thermoelectric material, respectively.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
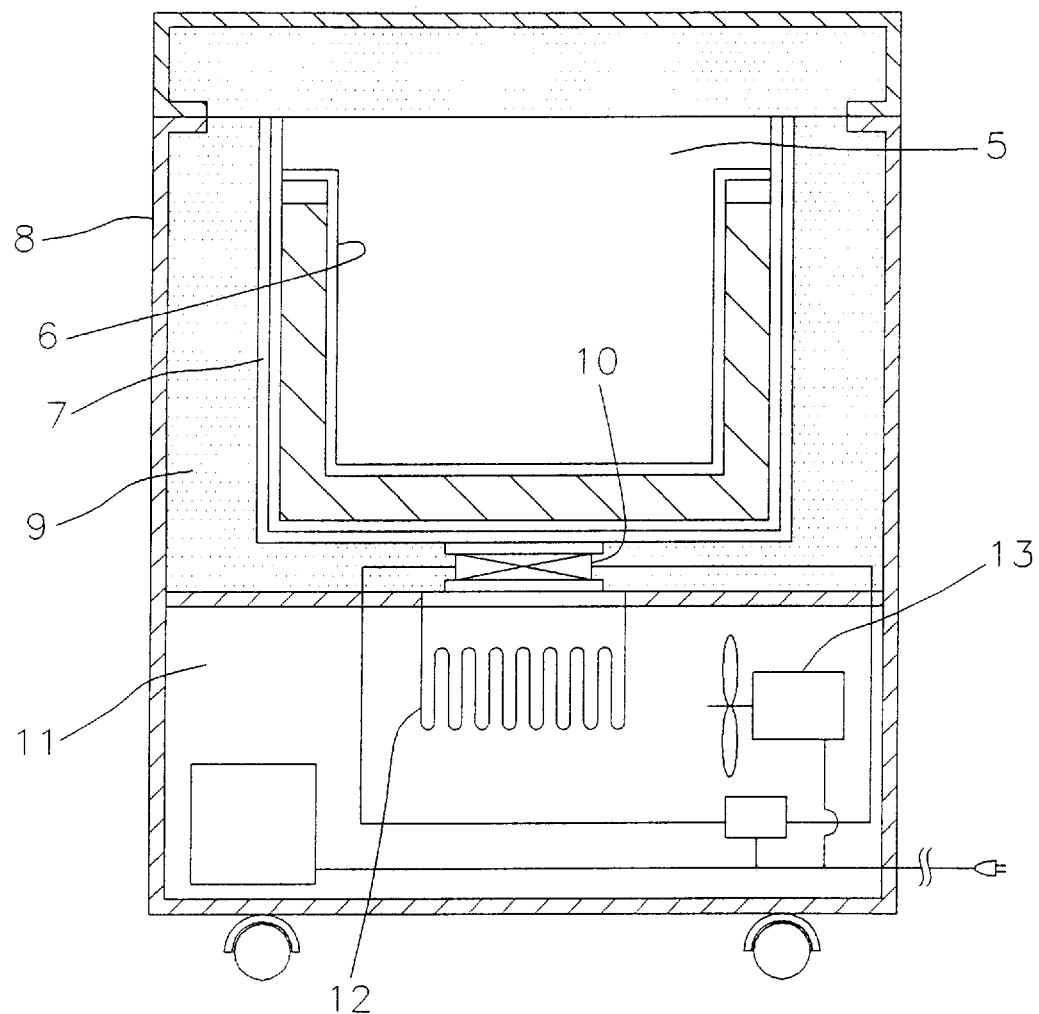
FIG. 1 shows a sectional view of a food storage device using a thermoelectric element in accordance with the prior art.
Figure 2:
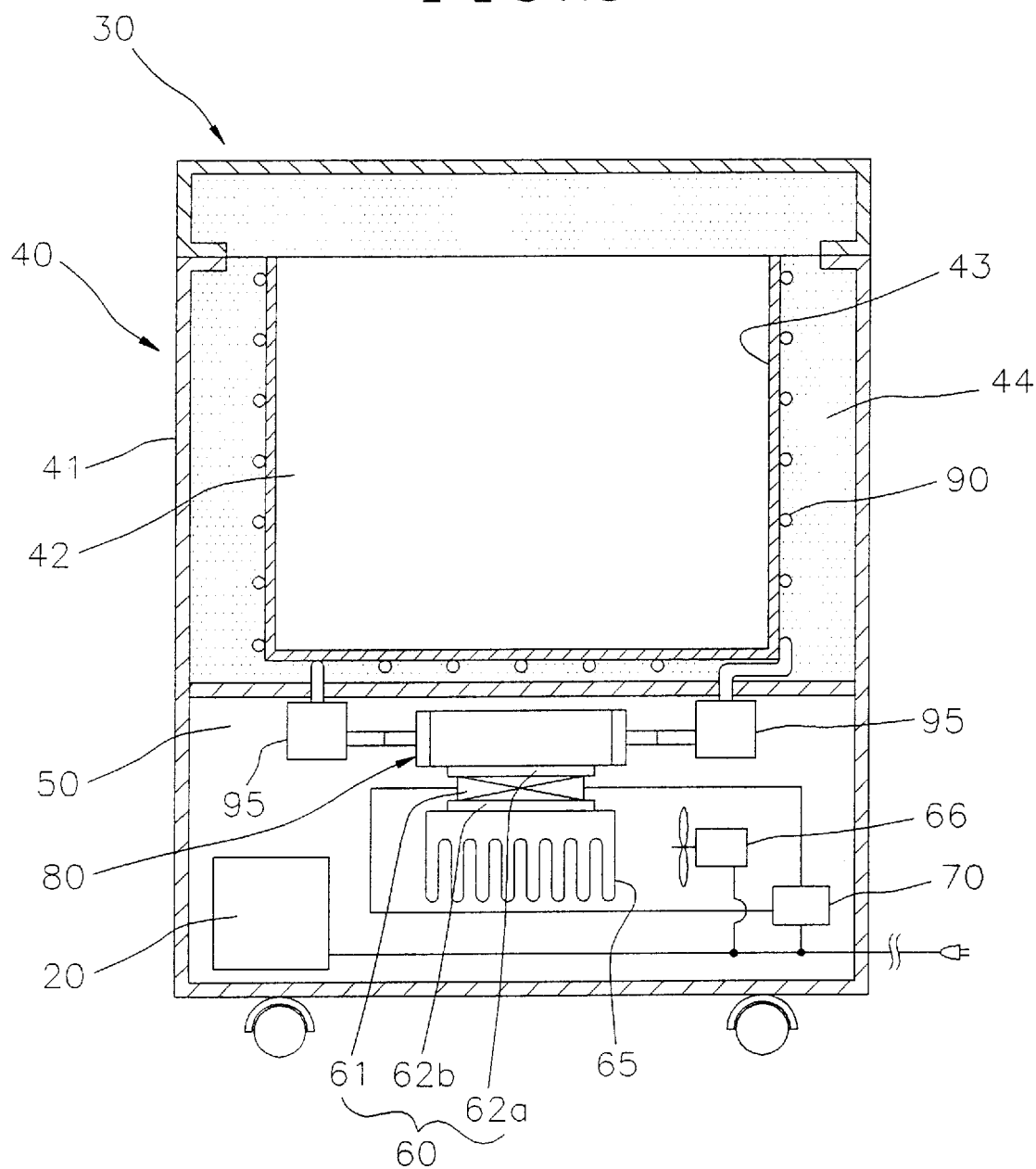
FIG. 2 illustrates a sectional view of a food storage device using a thermoelectric element in accordance with the present invention.

Referring to FIG. 2, the inventive food storage device is largely divided into a door 30 and a main body 40 which includes a food storage chamber 42 and a machinery chamber 50. An outer case 41 defines a contour of the inventive food storage device and can be manufactured into various shapes, e.g., a rectangular shape or a circular shape. The food storage chamber 42 defined with a wall 43, the door 30 and a bottom plate is prepared in an upper inside of the outer case 41 and provides a space for positioning foods to be fermented or refrigerated. In order to prevent the foods from being stuck fast to the wall 43 of the food storage chamber 42, fine folds are formed on a surface of the wall 43. Positioned between the wall 43 and the outer case 41 is a thermal insulation material 44 for preventing heat transfer between the food storage chamber 42 and an ambient air.

Figure 3:
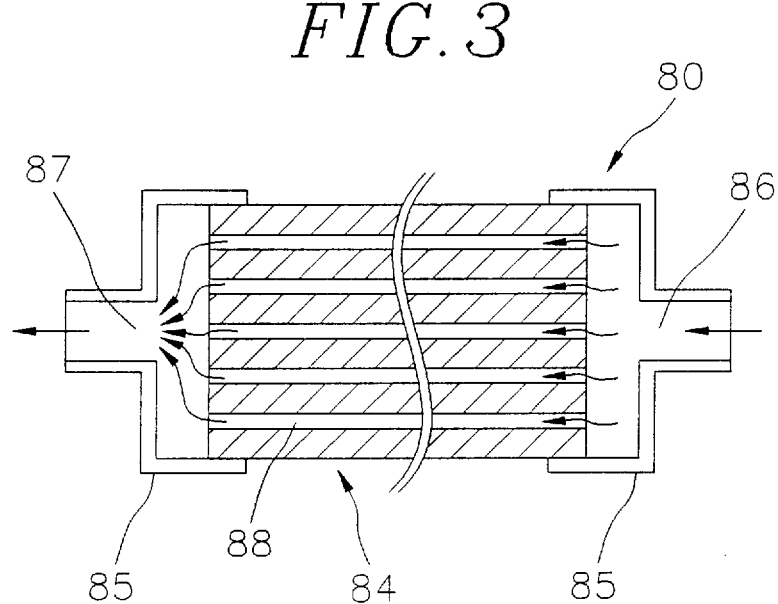
FIGS. 3 and 4 offer a sectional view and a side elevational view of a heat exchanger employed in the inventive food storage device, respectively.
Figure 4:
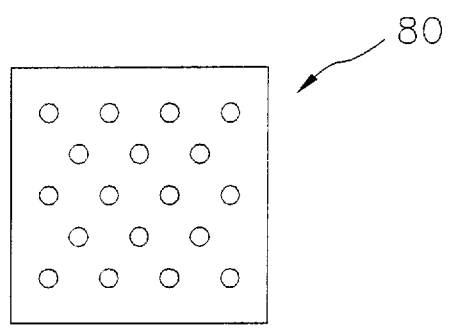

The machinery chamber 50 prepared in a lower inside of the outer case 41 includes therein a heat exchanger 80 of a substantially rectangular shape. As enlargedly illustrated in FIGS. 3 and 4, the heat exchanger 80 is provided with a tubular member 84 and a pair of cap members 85. The tubular member 84 has a plurality of channels 88 through which a refrigerating fluid flows. To both ends of the tubular member 84, the cap members 85 having an inlet opening 86 and an outlet opening 87, respectively, are mounted to maintain a seal relationship therebetween. A transitional separation is formed between the tubular member 84 and each of the cap members 85 to enable the refrigerating fluid flowing through the tubular member 84 to smoothly flow into the outlet opening 87 and to enable the refrigerating fluid flown from the inlet opening 86 to be easily distributed into each of the channels 88 of the tubular member 84.

Returning to FIG. 2, a first heat transfer plate 62a constituting a thermoelectric element 60 is adhered to an external surface of the heat exchanger 80 so as to heat/cool the refrigerating fluid flowing through the channels 88 of the heat exchanger 80. Preferably, the thermoelectric element employed in the present invention is in a form of module in which a plurality of unit thermoelectric elements are electrically connected to one another.

As well known to the art, the thermoelectric element 60 is a device based on the Peltier effect. The thermoelectric element 60 employed in the present invention is provided with a thermoelectric material 61 and the first and a second heat transfer plates 62a and 62b and is able to heat/cool the refrigerating fluid flowing through the channels 88 of the heat exchanger 80. That is, when a direct current is sent through a thermoelectric material 61 of a junction between two heat transfer plates 62a and 62b, heat absorption and heat dissipation occur in the two heat transfer plates 62a and 62b, respectively. In the inventive food storage device, a rectifier 70 is provided to convert an alternating current flow into a direct current flow to be sent to the thermoelectric material 61.

Figure 5A:
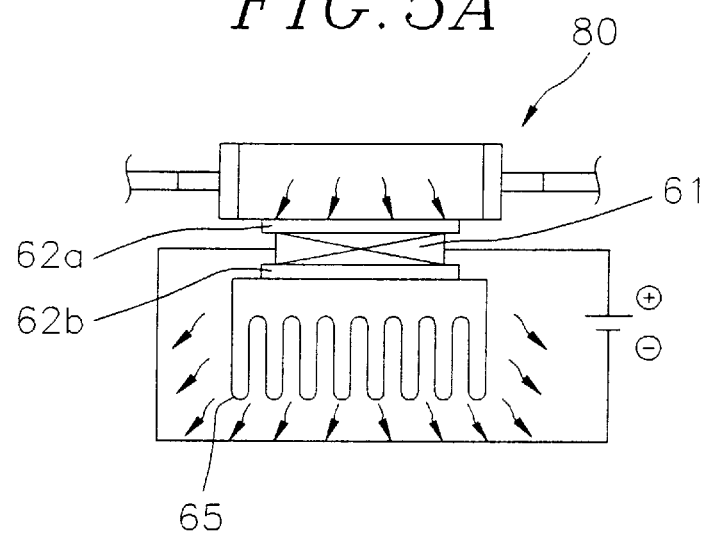
FIGS. 5A and 5B depict schematic views showing heat transfer in a refrigerating and a fermenting modes of the inventive food storage device, respectively.
Figure 5B:
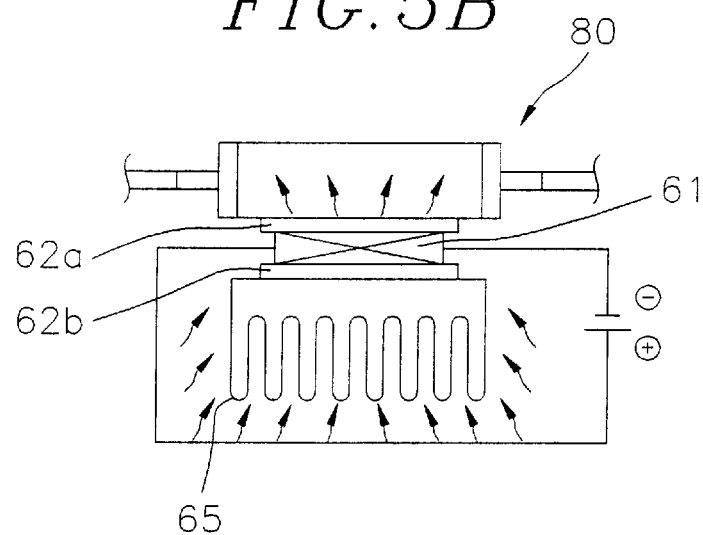

As well illustrated in FIGS. 5A and 5B, when the current flow is reversed, each of the heat transfer plates 62a and 62b shows contrary effect to the previous effect. In other words, the first heat transfer plate 62a absorbing heat, as indicated with arrows in FIG. 5A, turns to dissipate heat, as indicated with arrows in FIG. 5B; and the second heat transfer plate 62b dissipating heat as indicated with arrows in FIG. 5A, turns to absorb heat, as indicated with arrows in FIG. 5B.

Figure 6:
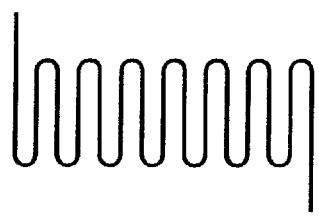
FIG. 6 presents a schematic view of a shape of a circulation tube employed in the inventive food storage device.

Returning to FIG. 2, a circulation tube 90 is installed to the wall 43 and the bottom plate of the food storage chamber 42, being adjacent to the same 42. Preferably, the circulation tube 90 is a zigzag shape defining parallel tube lines and alternating bent portions in order to maximize a surface area of the circulation tube in contact with the wall 43, as shown in FIG. 6. Both ends of the circulation tube 90 are communicated with the tubular member 84 of the heat exchanger 80 via the inlet and the outlet openings 86 and 87 of the cap members 85, respectively. In order to circulate the refrigerating fluid compulsorily, at least one pump 95 is mounted at both sides of the heat exchanger 80.

A dissipating plate 65 in thermal contact with the second heat transfer plate 62b is prepared within the machinery chamber 50 to urge the heat dissipation from the second heat transfer plate 62b on the purpose of speeding the heat absorption by the first heat transfer plate 62a. A cooling fan 66 is further prepared within the machinery chamber 50 to ensure a heat dissipation from the dissipating plate 65.

An operation of the inventive food storage device constructed in this manner is now described in detail.

When the food refrigerating device is in a refrigerating mode, the first heat transfer plate 62a of the thermoelectric element 60 absorbs heat from the refrigerating fluid. In order for this function to take place, a controller 20 supervising an entire function of the food storage device determines a direction of the current flow outputted from the rectifier 70 to send to the thermoelectric material 61. Further, the controller 20 energizes the pump 95. In response to this, the refrigerating fluid flows in the circulation tube 90 via the heat exchanger 80. At the same time, the first heat transfer plate 62a of thermoelectric element 60 absorbs heat from the refrigerating fluid flowing through the heat exchanger 80; and the second heat transfer plate 62b dissipates heat to the surroundings. In this process, heat dissipation assisted by the dissipating plate 65 and the cooling fan 66, from the second heat transfer plate 62b, urges heat absorption of the first heat transfer plate 62a.

For a fermenting mode of the food storage device, the controller 20 changes the direction of current flow sent to the thermoelectric material 61. As a result, as shown in FIG. 5B, the first heat transfer plate 62a heats the refrigerating fluid; and heat absorption is shown on the second heat transfer plate 62b.

Although the invention has been shown and described with respect to the preferred embodiments, it will be understood by those skilled in the art that various changes and modifications may be made without departing from the spirit and scope of the invention as defined in the following claims.

What is claimed is:

1. A food storage device provided with a food compartment within which the food is contained, the food storage device comprising:

a circulation tube for providing a fluid with a flow path arranged around the food compartment;

a heat exchanger connected to both ends of the circulation tube to thereby form a closed flow path for the fluid together with the circulation tube;

at least a pump mounted to one portion of the closed flow path so as to forcibly circulate the fluid along the closed flow path; and a thermoelectric element including a first heat transfer plate in thermal contact with said heat exchanger for heating the fluid in a fermenting mode of the food storage device and for cooling the fluid in a refrigerating mode of the food storage device, thermoelectric material and a second heat transfer plate opposed to the first heat transfer plate about the thermoelectric material to be in an external environment, the first and the second heat transfer plates adhering to the thermoelectric material, respectively.

2. The food storage device of claim 1, further comprising a dissipating plate for ensuring a heat dissipation from the second heat transfer plate.

3. The food storage device of claim 2, further comprising a cooling fan for cooling said dissipating plate.

4. The food storage device of claim 1, wherein the heat exchanger including a tubular member provided with a plurality of channels for the fluid to flow through and a pair of cap members mounted to both ends of the tubular body, each of the cap members having an opening in communication with the circulation tube.

5. The food storage device of claim 4, wherein a required transitional separation to allow the fluid to smoothly flow between the tubular member and the cap members is mounted between the opening of each of the cap members and corresponding end of the tubular member.

6. The food storage device of claim 1, wherein said thermoelectric element is in a form of module in which a plurality of unit thermoelectric elements are electrically connected to one another.

7. The food storage device of claim 1, wherein the heat exchanger is surrounded with a thermal insulation material after the first heat transfer plate is mounted thereto.

* * * * *